(12) United States Patent
Bellegarda

(10) Patent No.: US 7,149,695 B1
(45) Date of Patent: *Dec. 12, 2006

(54) METHOD AND APPARATUS FOR SPEECH RECOGNITION USING SEMANTIC INFERENCE AND WORD AGGLOMERATION

(75) Inventor: Jerome R. Bellegarda, Los Gatos, CA (US)

(73) Assignee: Apple Computer, Inc., Cupertino, CA (US)

(*) Notice: Subject to any disclaimer, the term of this patent is extended or adjusted under 35 U.S.C. 154(b) by 661 days.

This patent is subject to a terminal disclaimer.

(21) Appl. No.: 09/688,010

(22) Filed: Oct. 13, 2000

(51) Int. Cl.
*G10L 21/00* (2006.01)
*G10L 15/18* (2006.01)
*G10L 15/00* (2006.01)

(52) U.S. Cl. .................. 704/275; 704/257; 704/251

(58) Field of Classification Search ............ 704/257, 704/231, 237, 251, 238, 236, 275, 1, 9
See application file for complete search history.

(56) References Cited

U.S. PATENT DOCUMENTS

| | | | | |
|---|---|---|---|---|
| 5,122,951 A | * | 6/1992 | Kamiya | 704/9 |
| 5,345,536 A | * | 9/1994 | Hoshimi et al. | 704/243 |
| 5,675,819 A | * | 10/1997 | Schuetze | 704/10 |
| 5,828,999 A | * | 10/1998 | Bellegarda et al. | 704/240 |
| 5,860,063 A | * | 1/1999 | Gorin et al. | 704/257 |
| 5,943,670 A | * | 8/1999 | Prager | 707/5 |
| 6,173,261 B1 | * | 1/2001 | Arai et al. | 704/257 |
| 6,208,971 B1 | * | 3/2001 | Bellegarda et al. | 704/275 |
| 6,308,149 B1 | * | 10/2001 | Gaussier et al. | 704/9 |
| 6,317,707 B1 | * | 11/2001 | Bangalore et al. | 704/9 |
| 6,523,026 B1 | * | 2/2003 | Gillis | 707/3 |
| 6,631,346 B1 | * | 10/2003 | Karaorman et al. | 704/9 |
| 6,751,621 B1 | * | 6/2004 | Calistri-Yeh et al. | 707/100 |
| 2002/0026456 A1 | * | 2/2002 | Bradford | 707/500 |
| 2002/0032564 A1 | * | 3/2002 | Ehsani et al. | 704/235 |

* cited by examiner

*Primary Examiner*—David Hudspeth
*Assistant Examiner*—James S. Wozniak
(74) *Attorney, Agent, or Firm*—Blakely, Sokoloff, Taylor & Zafman LLP

(57) ABSTRACT

A method and apparatus for command recognition using semantic inference and word agglomeration is described herein. According to one aspect of the present invention, a method for recognizing a voice command comprises recognizing a sequence of words received as the voice command. The sequence of words is further agglomerated into a sequence of word n-tuples. Semantic inference is applied to the sequence of word n-tuples to recognize the voice command.

34 Claims, 5 Drawing Sheets

METHOD AND APPARATUS FOR SPEECH RECOGNITION USING SEMANTIC INFERENCE AND WORD AGGLOMERATION

BACKGROUND OF THE INVENTION

1. Field of the Invention

The present invention relates generally to pattern recognition. More particularly, this invention relates to speech recognition systems that recognize commands using semantic inference and word agglomeration.

2. Copyright Notice/Permission

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, Apple Computer, Inc., All Rights Reserved.

3. Background

As computer systems have evolved, the desire to use such systems for pattern recognition has grown. Typically, the goal of pattern recognition systems is to quickly provide accurate recognition of input patterns. One type of pattern recognition system is a voice recognition system, which attempts to accurately identify a user's speech. Another type of pattern recognition is a handwriting recognition system. A speech recognizer discriminates among acoustically similar segments of speech to recognize words, while a handwriting recognizer discriminates among strokes of a pen to recognize words.

An application of speech recognition is voice command and control (VCC), which enables a computer user to control a computer by voice rather than by using traditional user interfaces such as a keyboard and a mouse. Advances in speech recognition technology have enhanced the performance of VCC so that a computer can accurately perform a task by recognizing a command spoken within a restricted domain of vocabulary. However, existing VCC technology has limitations that diminish the usefulness of the technology to an average computer user.

Typical VCC applications employ a context-free grammar, such as a finite state grammar, that is a compact way of representing an exhaustive list of each and every command that the application can recognize. A finite state grammar is a particular implementation of a context-free grammar. These applications compare the spoken command to the list of commands underlying the context-free grammar. As a result, existing VCC applications that use a context-free grammar either reject or incorrectly recognize any utterance that is semantically accurate but syntactically out-of-grammar. This rigid framework requires the computer user to learn and memorize the specific commands that are compiled within the context-free grammar.

Semantic inference alleviates the problems associated with VCC applications that use a context-free grammar. Semantic inference is a more tolerant approach to language modeling that enables a computer to recognize commands that are out-of-grammar but semantically accurate, thereby allowing computer users to say what they mean rather than requiring them to speak from a pre-defined list of commands. For example, semantic inference will enable a user to say "make a new spreadsheet" when the pre-defined wording of the command is "Open Microsoft Excel."

VCC applications that use semantic inference typically employ a speech recognition unit to provide a transcription of the user's spoken command. A semantic classification engine applies semantic inference to the transcription to determine the desired action. Some VCC applications using semantic inference replace the context-free grammar in a speech recognition unit with a statistical language model such as an n-gram. A statistical language model makes it possible for the speech recognition unit to transcribe, with a reasonably low error rate, whatever formulation the computer user chooses for expressing a command. This substitution prevents the speech recognition unit from rejecting out-of-grammar voice inputs before the semantic classification engine has the opportunity to evaluate the voice input for semantic similarity.

However, regardless of whether the VCC application uses a context-free grammar or a statistical language model, current implementations of semantic inference operate only at the word level. This is because the latent semantic analysis that comprises the process of semantic inference is an instance of the so-called "bag-of-words" model, which pays no attention to the order of words in the command. As a result, commands containing the same words in a different order are erroneously mapped to the same representation. For example, the commands "Change icons to list" and "Change list to icons" are indistinguishable, even though the underlying commands are very different. Thus, while latent semantic analysis is well-suited to capture large-span (i.e., semantic) relationships between words, it is inherently unable to capitalize on the local (i.e., syntactic or pragmatic) constraints present in the language. To avoid the erroneous mapping of these types of commands to the same representation requires additional processing, such as performing back-off for sense disambiguation. The additional processing is undesirable since it consumes additional central processor unit (CPU) cycles and degrades performance. What is needed, therefore, is an improved method and apparatus for using semantic inference in a speech recognition system to more accurately recognize a command.

SUMMARY OF THE INVENTION

A method and apparatus for command recognition using semantic inference and word agglomeration is described herein. According to one aspect of the present invention, a method for recognizing a voice command comprises recognizing a sequence of words received as the voice command. The sequence of words is further agglomerated into a sequence of word n-tuples. Semantic inference is applied to the sequence of word n-tuples to recognize the voice command.

According to one aspect of the present invention, a machine-readable medium has stored thereon a plurality of instructions that, when executed by a processor, cause the processor to recognize a voice command by recognizing a sequence of words received as the voice command, to agglomerate the sequence of words into a sequence of word n-tuples, and to apply semantic inference to the sequence of word n-tuples to recognize the voice command.

According to one aspect of the present invention, an apparatus for recognizing a voice command includes a speech recognizer, a word agglomerator, and a semantic classifier. The speech recognizer recognizes a sequence of words received as the voice command, the word agglomerator agglomerates the sequence of words into a sequence of word n-tuples, and the semantic classifier applies semantic inference to the agglomerated word n-tuples to recognize the voice command.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
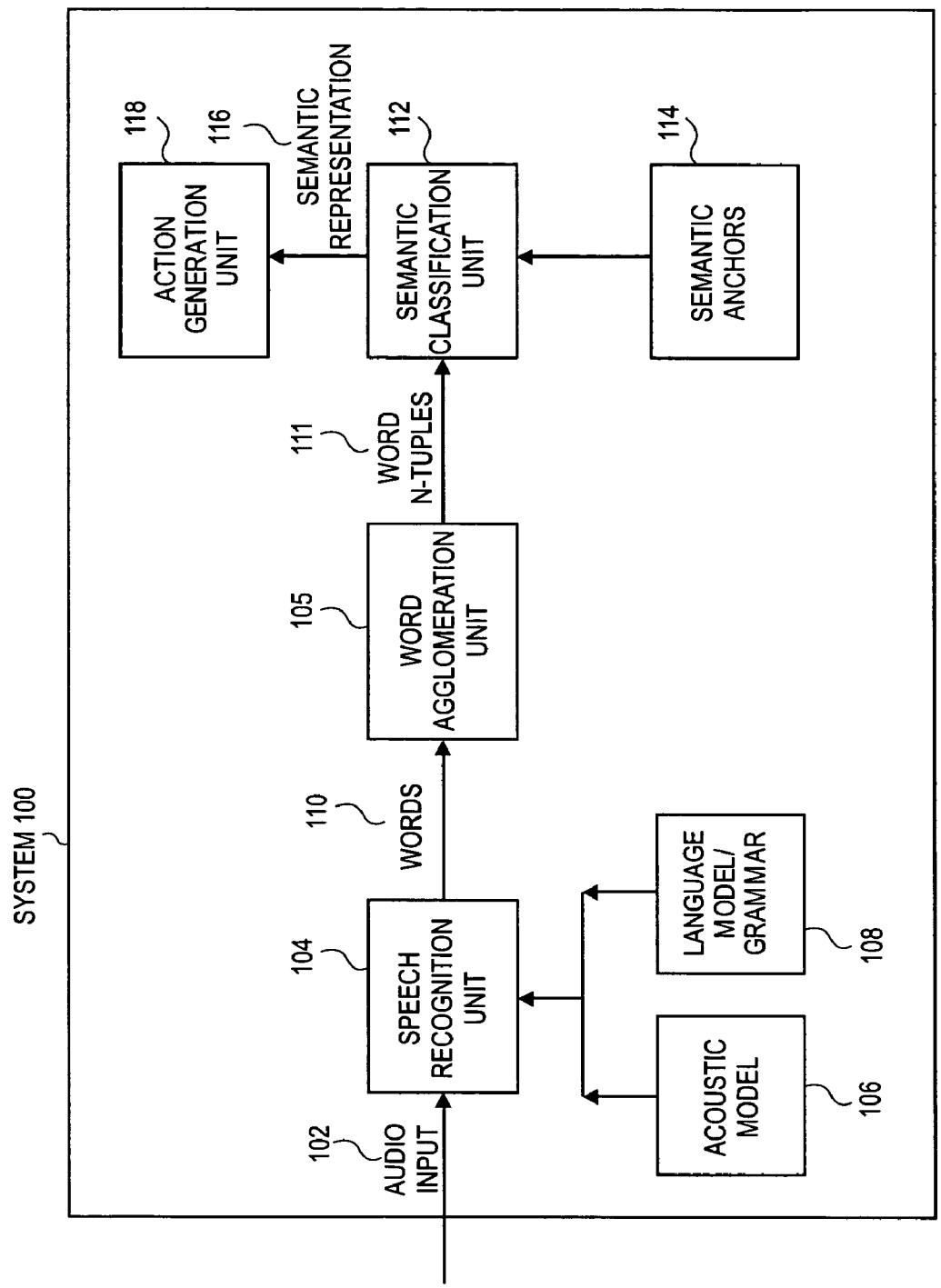
FIG. 1 is a block diagram illustrating a voice command recognition system according to one embodiment of the present invention.

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Additionally, various operations will be described as multiple discrete steps in turn in a manner that is helpful in understanding the present invention. However, the order of description should not be construed as to imply that these operations are necessarily order dependent, in particular, the order of their presentations.

The present invention provides a method and apparatus for command recognition using semantic inference and word agglomeration. Semantic inference is a process that uses latent semantic analysis (LSA) to capture the global semantic relationships between the words of a command by constructing a semantic space that characterizes co-occurrences between words and documents. LSA is a modification of a paradigm that was first formulated in the context of information retrieval, and it constructs the semantic space by using a singular value decomposition of a word-document correlation matrix. A document refers to the instances of sentences, phrases, or other word groupings associated with a particular command. Depending on the command, the order of the words may be important in distinguishing one command from another. However, semantic inference, by itself, does not address this problem since it does not take word order into account. Therefore, the method of the present invention proposes an extension to the basic LSA framework by embedding word agglomeration so that word order is taken into account in the construction of the semantic space. The word agglomeration/LSA extension captures the local syntactic constraints present in the commands by characterizing co-occurrences between word n-tuples and n-tuple documents, where each word n-tuple is the agglomeration of n successive words, and each n-tuple document corresponds to each original document written in terms of all the word n-tuples it contains.

According to one embodiment, an audio input is initially provided to a speech recognizer that uses a context-free grammar or a statistical language model, or any other technique that is capable of recognizing the words in the input. The recognized words are further agglomerated into a sequence of word n-tuples. The sequence of word n-tuples are then provided to a semantic classifier that, in conjunction with semantic anchors created using training data, classifies the input as corresponding to a particular command. The appropriate action, based on the particular command, can then be generated.

FIG. 1 is a block diagram illustrating speech recognition in a VCC system 100 using semantic inference and word agglomeration according to the present invention. A speech recognition unit 104 receives an audio input 102 and, using acoustic models 106 and a language model 108, generates a sequence of words 110. The audio input 102 is audio data that is input to the VCC system 100 and is intended to represent any type of audio data. Typically, the audio input 102 is a digitized representation of a human voice.

According to one embodiment of the present invention, the acoustic models 106 are hidden Markov models. Alternate embodiments can use different types of acoustic models, and any of a variety of conventional acoustic models other than hidden Markov models can be used. According to one embodiment of the present invention, the language model 108 is a context-free grammar, such as a finite state grammar, that is a compact way of representing an exhaustive list of each and every command that the VCC system 100 can recognize. Alternate embodiments of VCC system 100 can use different types of language models, including a conventional n-gram statistical language model (such as a bigram model, where n=2), where the probability of every word depends only on the n previous words. Hidden Markov models, n-gram language models, and context-free grammars are well-known to those skilled in the art and thus will not be discussed further except as they pertain to the present invention.

A word agglomeration unit 105 receives the sequence of words 110 and agglomerates them into a sequence of word n-tuples 111. According to one embodiment of the present invention, the process of word agglomeration performed by a word agglomerator 105 is accomplished by replacing the sequence of words 110 in the command with the associated word n-tuple sequence, i.e., the sequence of all strings of n consecutive words present in the original word sequence, resulting in a sequence of word n-tuples 111. A semantic classification unit 112 receives the sequence of word n-tuples 111 and determines the correlation between the sequence of word n-tuples 111 and one or more semantic anchors 114. The correlation is the distance between a vector corresponding to the sequence of word n-tuples 111 and the vectors corresponding to the semantic anchors 114. The semantic classification unit 112 classifies the sequence of word n-tuples 111 as corresponding to the semantic anchor 114 with the closest correlation. The semantic classification unit 112 sends a semantic representation 116 of the classified sequence of word n-tuples 111 to an action generation unit 118. The action generation unit 118 receives the semantic representation 116 and generates an action 120.

According to one embodiment of the present invention, the VCC system 100 separates different sequences of word n-tuples 111 from one another based on detected pauses between words in the voice input 102. In this embodiment, if the VCC system 100 detects silence for greater than a threshold period of time, then the VCC system 100 interprets the silence as a pause between separate sequences of word n-tuples 111 corresponding to separate commands. The semantic classification unit 112 generates a separate semantic representation 116 for each separate sequence of word n-tuples 111. Typical values for this threshold period of time range from approximately 300 milliseconds to approximately 3 seconds. In the illustrated implementation, the speech recognition unit 104 detects the pauses and indicates to the semantic classification unit 112 which sequences of word n-tuples 111 correspond to separate commands (e.g., by sending a signal to the semantic classification unit 112, or by grouping words of a sequence of word n-tuples 111 together, e.g., by using a linked list). Alternatively, other methods can be used to identify the beginning and/or ending of a sequence of word n-tuples 111, such as a manual input from a user (e.g., selection of a particular box via a graphical user interface and a pointer).

The action generation unit 118 uses the semantic representation 116 to determine the action 120 that is to be taken in response to the audio input 102 and generate the action 120. According to one embodiment, the action generation unit 118 maintains a mapping of possible semantic representations 116 to actions 120 (e.g., system commands to display time, open files, close applications, etc.). It is to be appreciated that a wide range of commands can be supported by the VCC system 100, with the exact nature of the commands being dependent on the environment where the VCC system 100 is used. The action generation unit 118 is well known to those skilled in the art, and thus will not be discussed further except as it pertains to the present invention.

Figure 2:
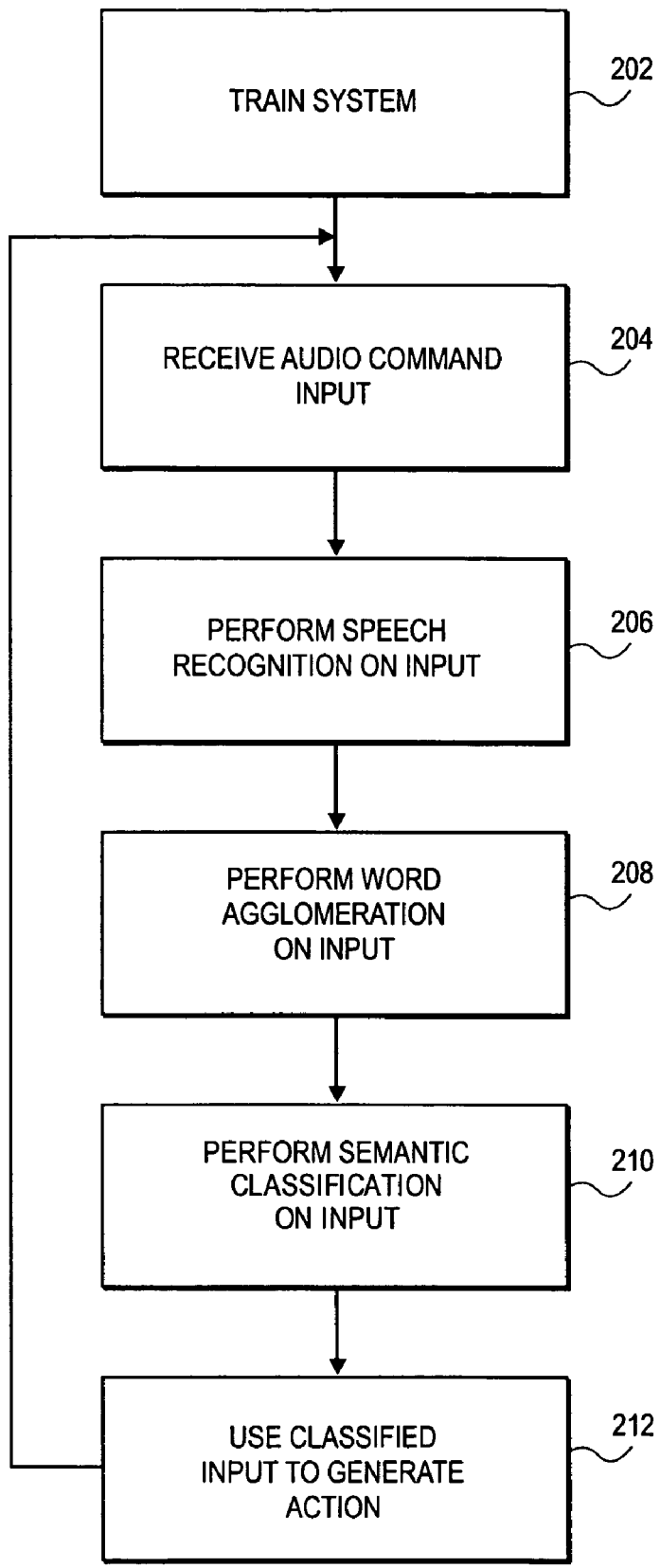
FIG. 2 is a flowchart illustrating the process followed in recognizing voice commands according to one embodiment of the present invention.

FIG. 2 is a flowchart illustrating the process followed in performing speech recognition in a VCC system according to one embodiment of the present invention. Initially, the VCC system is trained in step 202, producing semantic anchors that are used to classify audio input later during recognition (in step 210, below). This training can be done by the manufacturer (e.g., entering training data when the system is built) and/or by the user (e.g., the user speaking in the training data). In the illustrated embodiment, once the VCC system is initially trained, no further training is necessary for command recognition. However, a user may optionally perform additional training to, for example, customize a VCC system to a particular user's style.

After the VCC system is trained, an audio input 102 is eventually received in step 204. The speech recognition unit 104 recognizes and transcribes the audio input 102 into a sequence of words (i.e., the words of the input command) 110 in step 206. The word agglomeration unit 105 agglomerates the sequence of words 110 into a sequence of word n-tuples 111 in step 208. The semantic classification unit 112 classifies the sequence of word n-tuples 111 in step 210. The process of semantic classification generates a semantic representation 116 of the sequence of word n-tuples 111, and identifies, based on the semantic anchors produced during training in step 202, which command the semantic representation 116 actually represents. The semantic representation 116 is then used by the action generation unit 118 to carry out the desired action in step 212. As discussed in more detail below, the process of classification performed by the semantic classification unit 112 is based on the actual words that are part of the audio input 102 as well as the order of those words.

Figure 3:
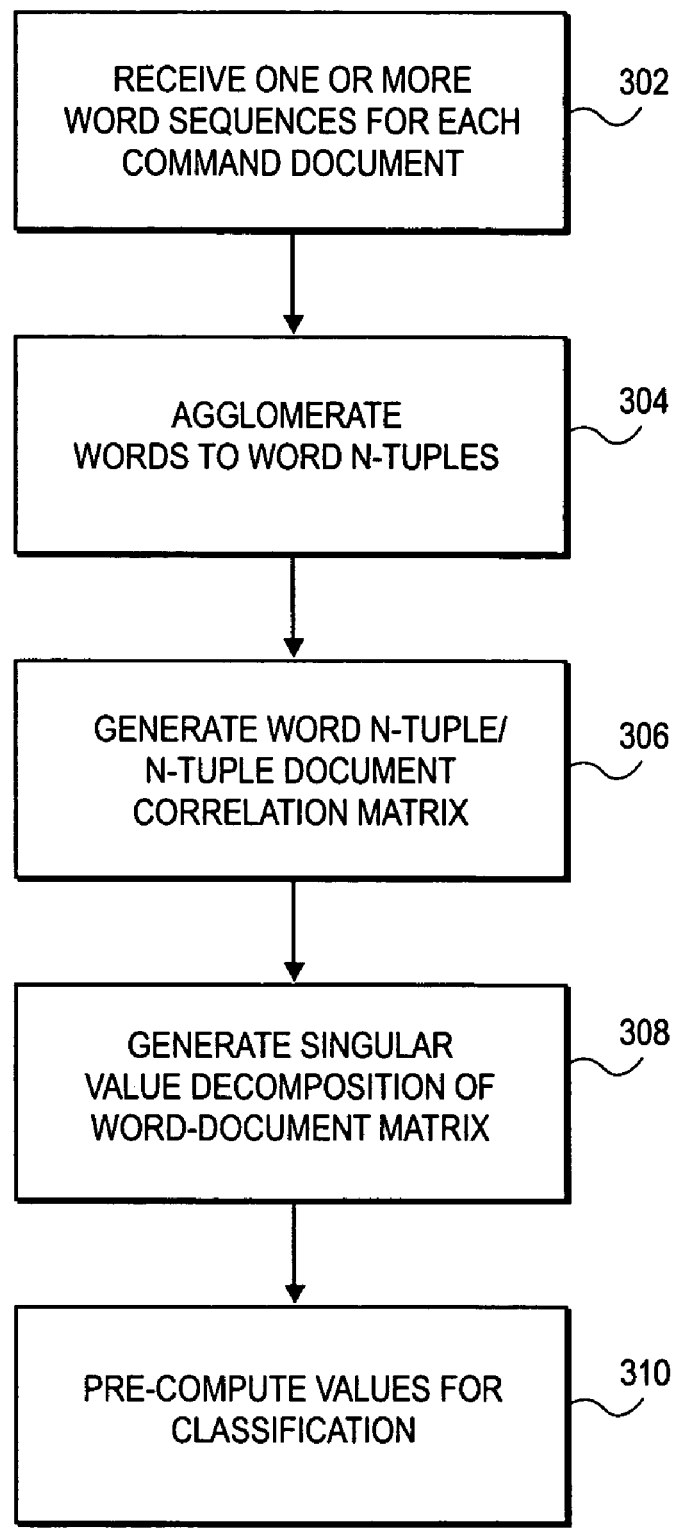
FIG. 3 is a flowchart illustrating the process of training the command recognition system according to one embodiment of the present invention.

FIG. 3 is a flowchart illustrating the process of training the command recognition system according to one embodiment of the present invention. According to one implementation, FIG. 3 illustrates the process of step 202 of FIG. 2 in more detail. Training data is entered into the system and mapped to a vector space having a particular dimension. For ease of explanation, in the discussions to follow the training data is referred to as sentences. However, it is to be appreciated that the training data can be sentences, phrases, or other word groupings. As noted earlier, instances of such units associated with a particular command form what is referred to as a "document" pertaining to that command. In the illustrated embodiment, the mapping is performed using an extension of the LSA framework that relies on a singular value decomposition of a word n-tuple/n-tuple-document correlation matrix, where each word n-tuple is the agglomeration of n successive words as formed by the previously described process of word agglomeration, and each n-tuple document corresponds to each original document written in terms of all the word n-tuples it contains.

The word n-tuple/n-tuple-document correlation matrix captures the co-occurrences between word n-tuples and n-tuple documents by tabulating the number of times each word n-tuple occurs in each n-tuple document. Assuming that the training database includes N n-tuple documents and a total of M different word n-tuples, and assuming that the word n-tuples form the rows of the matrix and the n-tuple documents form the columns, then each element (i,j) of the word n-tuple/n-tuple-document correlation matrix indicates how many times the corresponding word n-tuple $M_i$ occurs in the n-tuple document $N_j$. Each n-tuple document from a column of the matrix can be represented as a single vector containing M values, with the resulting vectors defining a mapping between the vocabulary of word n-tuples and a vector space of dimension M. As discussed in more detail below, this mapping can be refined by performing a singular value decomposition (SVD) of the correlation matrix, in which case the vector space is reduced to a dimension R, where R<M.

Note that word agglomeration does not impact the document dimension of the correlation matrix, but it does increase the word dimension by a factor theoretically up to $M^{n-1}$, where M is the size of the underlying vocabulary. As a practical matter, a reasonable limit on the size of the word agglomeration is $n \leq 3$, which is compatible with typical VCC applications where M is on the order of a couple of thousand. For large vocabulary language modeling applications, however, M could reach up to 100,000. Nevertheless, even large vocabulary language modeling applications can take advantage of word agglomeration as long as dimensionality is reduced before taking the SVD of the correlation matrix. One method for reducing dimensionality is to perform, for example, a distance-preserving random projection onto a subspace of double the expected SVD dimension. The methods for reducing dimensionality are well known to those skilled in the art, and thus will not be discussed further except as it pertains to the present invention.

As illustrated in FIG. 3, one or more sequences of words 110 (e.g. sentences) for each command document are first received in step 302. A "command document" refers to a collection of one or more sentences, phrases, word grouping, or other sequences of words 110 all intended to identify the same command. The sequence of words 110 comprising the command document are each agglomerated in step 304 into a corresponding sequence of word n-tuples 111, which taken together result in the formation of a command n-tuple document.

Specifically, let T represent a training text corpus, i.e., a collection of N documents of interest, and let V represent the underlying vocabulary, i.e., the set of all the words appearing in T, where |V|=M. To agglomerate the words in T the word agglomeration unit 105 first replaces each of the sequence of words in T by the associated word n-tuple sequence, i.e., the sequence of all strings of n consecutive words present in the original word sequence. Note that this replacement, or mapping, of words to word n-tuples defines the associated n-tuple vocabulary $\overline{V}$ comprising all the word n-tuples appearing in T, where the size of $\overline{V}$ is denoted by $\overline{M}$.

The process of word agglomeration in step 304 is further illustrated in the following example. Consider the following two commands:

$$\text{change pop-up to window} \quad (1)$$

and $$\text{change window to pop-up} \quad (2)$$

Using the original LSA framework, these two commands are mapped onto the exact same point in the LSA semantic space, making them impossible to disambiguate. By embedding word agglomeration, however, the two commands are mapped onto different points in the LSA extension semantic space. The word agglomeration is accomplished by replacing the sequence of words in the command with the associated word n-tuple sequence, i.e., the sequence of all strings of n consecutive words present in the original word sequence. To illustrate, in the simple case n=2, the commands (1) and (2) now become, respectively:

$$\text{\#:change change:pop-up pop-up:to to:window window:\#} \quad (3)$$

and $$\text{\#:change change:window window:to to:pop-up pop-up:\#} \quad (4)$$

where the pound symbol '#' represents a sentence boundary marker, and the colon symbol ':' is used to separate the two components of each 2-tuple. Thus, the word 2-tuples are obtained by shifting one word from left to right (or, alternatively, from right to left) and grouping the next 2 consecutive words together at each shift, resulting in a sequence of overlapping pairs of words. A similar process could be used with n=3 and so forth, depending on the requirements of the particular VCC application in which the present invention is embodied.

During training, the training corpus T, may consist of a command document for the command to change a display from a pop-up to a window and another command document for the command to change a display from a window to a pop-up. The commands could include the word groupings "change pop-up to window," "change from pop-up to window," "change to window," "change window to pop-up," "change from window to pop-up," and "change to pop-up" etc. For n=2, the associated word 2-tuples define the associated 2-tuple vocabulary $\overline{V}$ comprising all the word 2-tuples appearing in T, and are summarized in Table I.

TABLE I

| Word 2-tuples |
| --- |
| #:change |
| change:pop-up |
| pop-up:to |
| to:window |
| change:to |
| change:from |
| from:pop-up |
| window:# |
| from:window |
| window:to |
| change:window |
| to:pop-up |

The word n-tuple/n-tuple-document correlation matrix is then constructed in step 306 as an ($\overline{M} \times N$) matrix $\overline{W}$ of word n-tuples by n-tuple documents, whose entries reflect, for the training corpus T, which n-tuples appeared in what n-tuple documents. As indicated above, the entries of the word n-tuple/n-tuple-document correlation matrix $\overline{W}$ are generated by determining the number of times each of the M word n-tuples occurs in each of the N command documents. Using the above example for the commands to change a display from a pop-up to a window and vice versa, the counts of the number of times each of the M word n-tuples in the word n-tuple/n-tuple-document correlation matrix $\overline{W}$ are illustrated in Table II. Counts for all other word n-tuples in the word n-tuple/n-tuple-document correlation matrix $\overline{W}$ for the commands are zero.

TABLE II

| Word n-tuple | Pop-up to Window Count | Window to pop-up Count |
| --- | --- | --- |
| #:change | 3 | 3 |
| change:pop-up | 1 | 0 |
| pop-up:to | 2 | 0 |
| to:window | 3 | 0 |
| change:to | 1 | 1 |
| change:from | 1 | 1 |
| from:pop-up | 1 | 0 |
| window:# | 3 | 0 |
| from:window | 0 | 1 |
| window:to | 0 | 2 |
| change:window | 0 | 1 |
| to:pop-up | 0 | 3 |

An SVD of the word n-tuple/n-tuple-document correlation matrix $\overline{W}$ having an order of decomposition of R is then generated in step 308. The value of R can vary depending on the values of M and N, and by balancing computational speed (associated with lower values of R) against accuracy (associated with higher values of R). Typical values for R range from 5 to 50. The SVD is generated according to the following calculation:

$$\overline{W} \approx \hat{\overline{W}} = USV^T \quad (5)$$

where U represents the M×R matrix of left singular vectors, $V^T$ represents the transposition of the N×R matrix of right singular vectors, and S represents the R×R diagonal matrix of singular values. The generation of the left and right singular vectors, as well as the diagonal matrix of singular values, is well-known to those skilled in the art and thus will not be discussed further.

Given the SVD from calculation (5), a particular document $d_j$ of $\overline{W}$ can be determined based on the jth right singular vector $v_j$ according to the following calculation:

$$d_j = USv_j^T \quad (6)$$

Further, based on calculation (6) and using well-known mathematical functions and properties, the value of the jth right singular vector $v_j$ can be calculated according to the following:

$$v_j = d_j^T US^{-1} \quad (7)$$

It is to be appreciated that the value $US^{-1}$ does not change for different values of j, and therefore the value $US^{-1}$ can be pre-calculated in step 310, and used during classification of input values as discussed in more detail below. This pre-calculation reduces the computation required during command classification, thereby increasing the speed of the command recognition system during operation.

Thus, from the training corpus T, a large-span semantic vector space having a dimension R is created. Each document from the training corpus T results in a different semantic anchor within that vector space. Furthermore, each of the semantic anchors is based not only on the actual words of the training data but also on the order of the words in the training data. The semantic anchors are used in classifying input data as a particular command, as discussed in more detail below.

Figure 4:
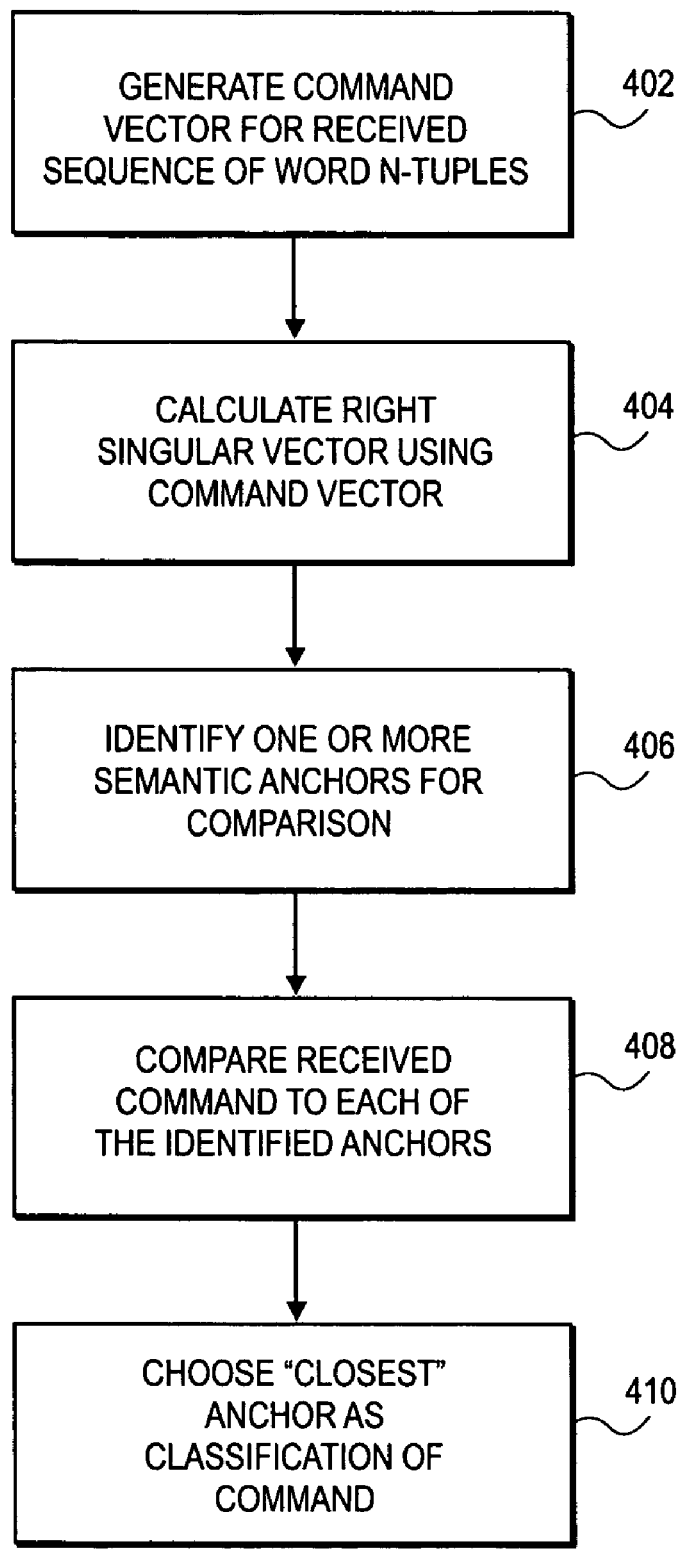
FIG. 4 is a flowchart illustrating the process followed in classifying voice input according to one embodiment of the present invention.

FIG. 4 is a flowchart illustrating the process followed in classifying audio input according to one embodiment of the present invention. According to one implementation, FIG. 4 illustrates the process of step 210 of FIG. 2 in more detail. As illustrated, a vector is first generated for the received sequence of word n-tuples in step 402.

After the word agglomeration unit 105 generates the sequence of word n-tuples 111 for a new audio input 102, the semantic classification unit 112 creates a new command vector $d_p$ of order M that identifies the number of occurrences of each of the M word n-tuples in the sequence of word n-tuples 111 in step 402. The semantic classification unit 112 then determines the value of the right singular vector $v_p$ corresponding to this new sequence of word n-tuples 111 in step 404, according to the following calculation (similar to calculation (7) discussed above):

$$v_p = d_p^T US^{-1} \quad (8)$$

As discussed above, $US^{-1}$ is pre-computed. Therefore, the only computation which occurs at this step is the matrix multiplication of $d_p^T$ by the pre-computed value $US^{-1}$. The result of calculation (8), $v_p$, is a semantic representation 116 of the new sequence of word n-tuples 111 in the vector space R.

The semantic classification unit 112 then identifies one or more semantic anchors 114 to be used for comparison to the semantic representation vector $v_p$ 116 in step 406. According to one embodiment of the present invention, all of the semantic anchors 114 generated from the training corpus T are used for comparison, and thus all are identified in step 406. Alternatively, the semantic anchors 114 can be clustered into different groups, each group including a subset of the anchors from the training data. Any of a variety of clustering algorithms, such as bottom-up clustering, can be used. Clustering algorithms are well-known to those skilled in the art, and thus will not be discussed further except as they pertain to the present invention.

The classifier then compares the semantic representation $v_p$ 116 of the new sequence of word n-tuples 111 to one or more of the different semantic anchors 114 in the vector space previously calculated from the training corpus T step 408. A "distance" between the semantic representation vector $v_p$ 116 and each of the one or more semantic anchor training vectors 114 is then determined, with the "distance" representing the similarity between the vectors. Two vectors which are similar have a small distance between one another, whereas vectors which are less similar have larger distances between one another. The semantic classification unit 112 assigns the semantic representation vector $v_p$ 116 to the semantic anchor training vector 114 that is closest in distance to the semantic representation vector $v_p$ 116 in step 410.

The distance between the semantic representation vector $v_p$ 116 and a semantic anchor vector $v_j$ 114 from the training data can be calculated in a variety of different manners. According to one embodiment of the present invention, the distance z between the semantic representation vector v 116 and a semantic anchor vector $v_j$ 114 from the training data is determined by calculating the inverse cosine of the similarity between $v_p S$ and $v_j S$ according to the following calculation:

$$z = \cos^{-1} \frac{v_p S^2 v^T j}{\|v_p S\| \|v_j S\|} \quad (9)$$

According to an alternate embodiment of the present invention, the distance z between the semantic representation vector $v_p$ 116 and one of the semantic anchor vectors $v_j$ 114 from the training data is determined by calculating the Euclidean distance between the two vectors according to the following calculation:

$$z = \sqrt{\sum_{i=1}^{R} ((v_p)_i - (v_j)_i)^2} \quad (10)$$

The comparison process in steps 408 and 410 can be accomplished in a variety of manners. According to another embodiment, comparisons for all of the identified semantic anchors 114 are made and the semantic anchor $v_j$ 114 that is most similar to the semantic representation vector $v_p$ 116 is selected. According to an alternate embodiment, as soon as a semantic anchor $v_j$ 114 that is less than a threshold distance from the semantic representation vector v 116 is discovered, the comparison process ends and that semantic anchor $v_j$ 114 is determined to be the "closest" in step 410.

Thus, as can be seen in FIG. 4, the classification of the input command is performed using semantic inference and word agglomeration. It is a semantic representation of the word n-tuples of the audio input that is compared to the semantic anchors associated with the word n-tuples of the commands in the training data in order to classify the audio input.

Figure 5:
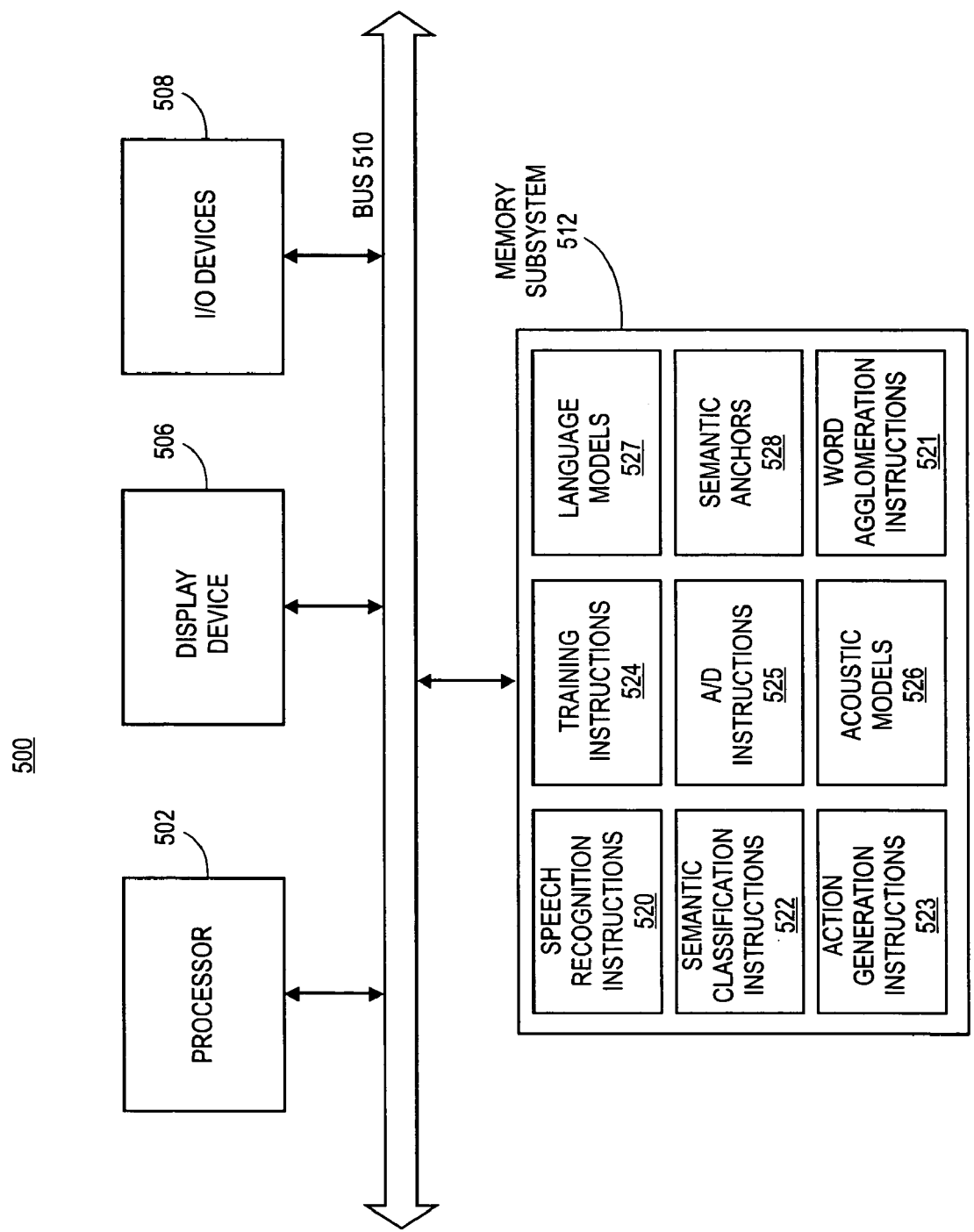
FIG. 5 illustrates one embodiment of a computing device suitable for use with one embodiment the present invention.

FIG. 5 illustrates one embodiment of a computing device suitable for use with one embodiment the present invention. According to one implementation, command recognition system 100 of FIG. 1 is a hardware system 500 of FIG. 5. In the illustrated embodiment of FIG. 5, system 500 includes processor 502, display device 506, and input/output (I/O)

devices 508, coupled to each other via a bus 510. Additionally, a memory subsystem 512, which can include one or more of cache memories, system memory (RAM), and nonvolatile storage devices (e.g., magnetic or optical disks) is also coupled to bus 510 for storage of instructions and data for use by processor 502. I/O devices 508 represent a broad range of input and output devices, including keyboards, cursor control devices (e.g., a trackpad or mouse), microphones, speakers, network or telephone communication interfaces, printers, etc. Hardware system 500 also includes well-known audio processing hardware and/or software to transform analog voice data to a digital form which can be processed by system 500.

These elements 502–512 perform their conventional functions known in the art. Collectively, these elements are intended to represent a broad category of hardware systems, including but not limited to general purpose computer systems based on the PowerPC® processor family of processors available from Motorola, Inc. of Schaumburg, Illinois, or the Pentium® processor family of processors available from Intel Corporation of Santa Clara, Calif.

It is to be appreciated that various components of hardware system 500 may be re-arranged, and that certain implementations of the present invention may not require nor include all of the above components. For example, a display device may not be included in system 500. Additionally, multiple buses (e.g., a standard I/O bus and a high performance I/O bus) may be included in system 500. Furthermore, additional components may be included in system 500, such as additional processors (e.g., a digital signal processor), storage devices, memories, network/communication interfaces, etc.

In the illustrated embodiment of FIG. 5, the method and apparatus for command recognition using semantic inference and word agglomeration according to the present invention as discussed above is implemented as a series of software routines run by hardware system 500 of FIG. 5. These software routines comprise a plurality or series of instructions to be executed by a processor in a hardware system, such as processor 502 of FIG. 5. Initially, the series of instructions are stored on a storage device of memory subsystem 512. It is to be appreciated that the series of instructions can be stored using any conventional storage medium, such as a diskette, CD-ROM, magnetic tape, DVD, ROM, Flash memory, etc. It is also to be appreciated that the series of instructions need not be stored locally, and could be received from a remote storage device, such as a server on a network, via a network/communication interface. The instructions are copied from the storage device, such as mass storage, into system memory and then accessed and executed by processor 502. In one implementation, these software routines are written in the C++ programming language. It is to be appreciated, however, that these routines may be implemented in any of a wide variety of programming languages.

These software routines are illustrated in memory subsystem 512 as speech recognition instructions 520, word agglomeration instructions 521, semantic classification instructions 522, action generation instructions 523, and training instructions 524. Also illustrated are analog to digital (A/D) transformation instructions 525, acoustic model(s) 526, language model(s) 527, and semantic anchors 528.

In alternate embodiments, the present invention is implemented in discrete hardware or firmware. For example, one or more application specific integrated circuits (ASICs) could be programmed with the above described functions of the present invention. By way of another example, speech recognition unit 104, word agglomeration unit 105, semantic classification unit 112, and action generation unit 118 of FIG. 1 could be implemented in one or more ASICs of an additional circuit board for insertion into hardware system 500 of FIG. 5.

In the discussions above, the present invention is described with reference to voice recognition systems. It is to be appreciated, however, that alternate embodiments of the present invention can be used with other types of pattern recognition systems, such as visual rather than audio pattern recognition, handwriting recognition systems (e.g., optical character recognition (OCR)), etc.

It is to be appreciated that the command recognition system of the present invention can be employed in any of a wide variety of manners. By way of example, the command recognition system could be used in conventional personal computers, security systems, home entertainment or automation systems, etc.

Therefore, a command recognition using semantic inference and word agglomeration has been described. An audio input is provided to a speech recognizer that identifies the words in the input. The sequence of words comprising the audio input are then provided to a word agglomerator that agglomerates the words into word n-tuples. The resulting sequence of word n-tuples are then provided to a semantic classifier that classifies the audio input as corresponding to a particular command. This classification process is advantageously based on a semantic representation of the word n-tuples that comprise the audio input rather than on a semantic representation of the words themselves. The appropriate action, based on the particular command associated with the semantic representation, can then be generated. The semantic representation of the word n-tuples that comprise the audio input advantageously allows the present invention to accurately identify commands with different word orders or syntax.

The performance of the above system was tested in the context of the "Speakable Items" desktop command and control task defined in MacOS 9. During performance testing, three different setups were considered: (i) semantic inference using classical LSA with standard word-document co-occurrences, i.e., word 1-tuples (n=1); (ii) semantic inference using extended LSA with word pair agglomeration (n=2); and (iii) semantic inference using extended LSA with word triplet agglomeration (n=3). The sizes of the resulting LSA matrices were 545×120, 2178×120, and 3720×120, respectively. When using R=62 for the order of the decomposition, the average classification error rates by agglomeration size were 4.7%, 2.5%, and 1.7%, respectively, as illustrated in Table III.

TABLE III

| Agglomeration Size | Classification Error Rate |
| --- | --- |
| n = 1 | 4.7% |
| n = 2 | 2.5% |
| n = 3 | 1.7% |

Thus, a method and apparatus for command recognition using semantic inference and word agglomeration has been described. Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed:

1. A method for recognizing speech, the method comprising:
   recognizing a sequence of words;
   processing the sequence of words using word agglomeration that replaces the sequence of words with an associated n-tuple sequence, the n-tuple sequence comprising word n-tuples that are all strings of n consecutive words in the sequence of words, wherein the n-tuple sequence is represented by a vector representation in a semantic space; and
   classifying the processed sequence of words as a predetermined command based on the vector representation of the n-tuple sequence in the semantic space.

2. The method of claim 1, further comprising performing an action corresponding to the predetermined command.

3. The method of claim 1, wherein classifying comprises semantically inferring the predetermined command from the associated word n-tuple sequence.

4. The method of claim 1, wherein classifying comprises semantically inferring the predetermined command from the processed sequence of words.

5. The method of claim 4, wherein semantically inferring comprises determining a correlation between the processed sequence of words and at least one semantic anchor.

6. The method of claim 5, wherein the correlation is a distance between the vector corresponding to the processed sequence of words and a vector corresponding to the at least one semantic anchor.

7. The method of claim 6, wherein semantically inferring further comprises selecting the predetermined command from the semantic anchor vector having the shortest distance.

8. The method of claim 7, wherein the semantic anchor represents a one of a plurality of predetermined commands.

9. The method of claim 5, wherein the at least one semantic anchor is derived from a training data.

10. The method of claim 4, wherein semantically inferring the predetermined command depends on the order of the words in the processed sequence of words.

11. The method of claim 1, wherein the classifying comprises:
    generating the vector representation of the processed sequence of words; and
    comparing the vector representation to a plurality of semantic anchors, wherein each of the plurality of semantic anchors corresponds to one of a plurality of voice commands.

12. The method of claim 11, wherein the classifying further comprises:
    selecting a semantic anchor from the plurality of semantic anchors that is most similar to the vector representation; and
    classifying the processed sequence of words as the command that corresponds to the selected semantic anchor.

13. The method of claim 12, wherein the selecting comprises:
    for each of the plurality of semantic anchors, identifying the similarity between the vector representation and the semantic anchor by calculating the cosine of the angle between the product of the vector representation and a diagonal matrix of singular values and the product of the semantic anchor and the diagonal matrix of singular values; and
    selecting the semantic anchor from the plurality of semantic anchors that corresponds to the largest cosine value as the semantic anchor that is most similar to the vector representation.

14. The method of claim 11, wherein the vector representation is an indication of how frequently each of a plurality of word n-tuples occurs within the processed sequence of words.

15. The method of claim 14, wherein each of the plurality of semantic anchors is an indication of how frequently each of the plurality of word n-tuples occurs with respect to the corresponding command.

16. The method of claim 11, wherein each of the plurality of semantic anchors represents a plurality of different ways of speaking the corresponding command.

17. The method of claim 11, wherein each of the plurality of semantic anchors represents a plurality of different commands having the same words, but in a different order.

18. A machine-readable medium having stored thereon a plurality of instructions that, when executed by a processor, cause the processor to recognize a voice command by:
    recognizing a sequence of words;
    processing the sequence of words using word agglomeration that replaces the sequence of words with an associated n-tuple sequence, the n-tuple sequence comprising word n-tuples that are all strings of n consecutive words in the sequence of words, wherein the n-tuple sequence is represented by a vector representation in a semantic space; and
    classifying the processed sequence of words as a predetermined command based on the vector representation of the n-tuple sequence in the semantic space.

19. The machine-readable medium of claim 18, wherein the plurality of instructions further cause the processor to perform an action corresponding to the predetermined command.

20. The machine-readable medium of claim 18, wherein the instructions for classifying comprises semantically inferring the predetermined command from the associated word n-tuple sequence.

21. The machine-readable medium of claim 18, wherein the instructions for semantically inferring comprises determining a correlation between a semantic representation of the associated word n-tuple sequence and at least one semantic anchor.

22. The machine-readable medium of claim 21, wherein the instructions for determining a correlation comprise determining a distance between the vector corresponding to the semantic representation and a vector corresponding to the at least one semantic anchor.

23. The machine-readable medium of claim 22, wherein the instructions for semantically inferring further comprises selecting the predetermined command from the semantic anchor vector having the shortest distance to the vector corresponding to the semantic representation.

24. The machine-readable medium of claim 21, wherein the at least one semantic anchor represents a one of a plurality of predetermined commands.

25. The machine-readable medium of claim 21, wherein the at least one semantic anchor is derived from a training data.

26. The machine-readable medium of claim 21, wherein the performance of the instructions for semantically inferring the predetermined command depends on the order of the words in the processed sequence of words.

27. An apparatus for recognizing a voice command, the apparatus comprising:

a speech recognizer to recognize a sequence of words received as the voice command;

a processor to process the sequence of words using word agglomeration that replaces the sequence of words with an n-tuple sequence, the n-tuple sequence comprising word n-tuples that are all strings of n consecutive words in the sequence of words, wherein the n-tuple sequence is represented by a vector representation in a semantic space; and a semantic classifier, coupled to the processor, to semantically infer from the representation of the n-tuple sequence in the semantic space which of a plurality of predetermined commands correlate to the voice command.

28. The apparatus of claim 27, further comprising:

an action generator, coupled to the semantic classifier, to use the vector representation to determine an action to be performed.

29. The apparatus of claim 27, wherein the semantic classifier is further to compare the vector representation to a plurality of semantic anchors, wherein each of the plurality of semantic anchors corresponds to a one of the plurality of predetermined commands.

30. The apparatus of claim 29, wherein the semantic classifier is further to identify a semantic anchor from the plurality of semantic anchors that is most similar to the vector representation, and to classify the vector representation as the one of the plurality of predetermined commands that corresponds to the identified semantic anchor.

31. An apparatus for recognizing a voice command, the apparatus comprising:

means for recognizing a sequence of words received as the voice command;

means for processing the sequence of words using word agglomeration that replaces the sequence of words with an n-tuple sequence, the n-tuple sequence comprising word n-tuples that are all strings of n consecutive words in the sequence of words, wherein the n-tuple sequence is represented by a vector representation means, coupled to the means for processing, for semantically inferring from the vector representation of the n-tuple sequence in the semantic space which of a plurality of predetermined commands correlate to the voice command.

32. The apparatus of claim 31, further comprising means, coupled to the means for semantically inferring, for using the vector representation to determine an action to be performed.

33. The apparatus of claim 31, wherein the means for semantically inferring further comprises:

means for comparing the vector representation to a plurality of semantic anchors, wherein each of the plurality of semantic anchors corresponds to one of a plurality of predetermined commands.

34. The apparatus of claim 33, wherein the means for semantically inferring further comprises:

means for identifying a semantic anchor of the plurality of semantic anchors that is most similar to the vector representation; and means for classifying the vector representation as the one of the plurality of predetermined commands that corresponds to the identified semantic anchor.

* * * * *